United States Patent [19]

Ellingham et al.

[11] 4,057,346
[45] Nov. 8, 1977

[54] AUTOMATIC FILM TRANSPORTER

[76] Inventors: Walter Ellingham, 516 Lincoln Ave., Staten Island, N.Y. 10306; Edward J. Nolan, 402 Davis Ave., Staten Island, N.Y. 10310

[21] Appl. No.: 697,082

[22] Filed: June 16, 1976

[51] Int. Cl.² .................. G03B 27/52; G03B 27/32
[52] U.S. Cl. ...................................... 355/41; 355/64
[58] Field of Search ............................ 355/41, 64, 38

[56] References Cited

U.S. PATENT DOCUMENTS

| | | | |
|---|---|---|---|
| 2,600,636 | 6/1952 | Goetz et al. | 355/64 X |
| 3,113,498 | 12/1963 | Kallenberg | 355/64 |
| 3,252,370 | 5/1966 | Luther | 355/64 X |
| 3,516,741 | 6/1970 | Thaddey | 355/41 X |
| 3,768,903 | 10/1973 | Steinberger et al. | 355/41 X |
| 3,768,905 | 10/1973 | Williams | 355/41 X |
| 3,881,820 | 5/1975 | Muir | 355/41 |
| 3,992,092 | 11/1976 | Place | 355/41 |

Primary Examiner—Donald A. Griffin
Attorney, Agent, or Firm—Allison C. Collard

[57] ABSTRACT

An automatic machine and method for transporting and printing a film track of individual film negatives and corresponding perforated holes, having the film track on a take-up reel and supply reel extending therebetween to a printer, the latter including a light source lens and a screen for printing film on a printing stock, and a bezzle plate having an opening substantially equal in size to that of a negative. A photoelectric device mounted on a yoke for detecting a perforated hole in the film. A control device for stopping the feed of the film track in response to the detection of the perforated hole, and actuating a printer print cycle substantially simultaneously therewith, and subsequently automatically feeding the film track again.

10 Claims, 10 Drawing Figures

AUTOMATIC FILM TRANSPORTER

The present invention relates to an automatic film transporter, in general, and to an automatic film transporter for transporting a strip of film for printing individual negatives, in particular.

With such devices, the film track, which constitutes a plurality of end-to-end spliced negative frames with identification information on strips between the separate frames, is advanced frame by frame by manual hand and foot control. Accordingly, the conventional units, such as Pakotronic printers and Kodak 5S printers, print different films at a rate of only 500 up to 1,000 prints per hour.

It is an object of the present invention to produce an economical automatic film transporter which automatically prints a greater number of prints per hour.

It is another object of the present invention to provide a device for cooperative combination with a conventional Pakotronic and Kodak 5S printer and for modifying and improving the latter as aforementioned, and providing improved stability for transportation of the film without slipping, as well as including an automatic control for the transportation and printing cycle operation.

It is still another object of the present invention to provide an automatic film transporter in accordance with the above-mentioned objectives, comprising a photocell yoke unit detachably mounted on the bezzle plate of a conventional unit, whereby the perforations which indicate the position of the individual negative frames are detected by the photocell, as well as an automatic control device connected to the photocell for controlling an intermittent driving and printing of the frames of the film track. In accordance with the above-mentioned objective, the photocell yolk unit may be exchanged with differently sized yolk units corresponding to the size of the film to be printed. The same photocell converter which is releasably connected to a photocell is used with any of the exchangeable yolks. A capstan drive and film tensioning apparatus is also provided between the take-up reel and the printing lens to insure that the film does not slip relative to the surface of the capstan drive, the latter advancing and stopping the film in response to the photoelectric sensing of the film perforations, in cooperation with the aforementioned control. The control includes a control box connected to the photocell and having a plurality of optional on-off buttons, such as, for example, a manual semiautomatic one frame at a time advance switch, an automatic switch, power supply on-off switch, and a pulse button for multiple prints of the same frame.

With the device of the present invention, up to 2,400 to 3,000 prints per hour may be processed, depending on the negative density and speed of the printer. The capstan is the sole friction drive for the film. The device of the present invention is designed to print sizes 110 and 126 films, as well as 35, 120 and 70 millimeter, to which it may be easily adapted by the exchangeable yoke unit.

Other objects and features of the present invention will become apparent by reference to the drawings which disclose a preferred embodiment of the automatic film transporter in accordance with the present invention, of which FIG. 1 is a front view of an automatic film transporter in accordance with the present invention;

Figure 1:
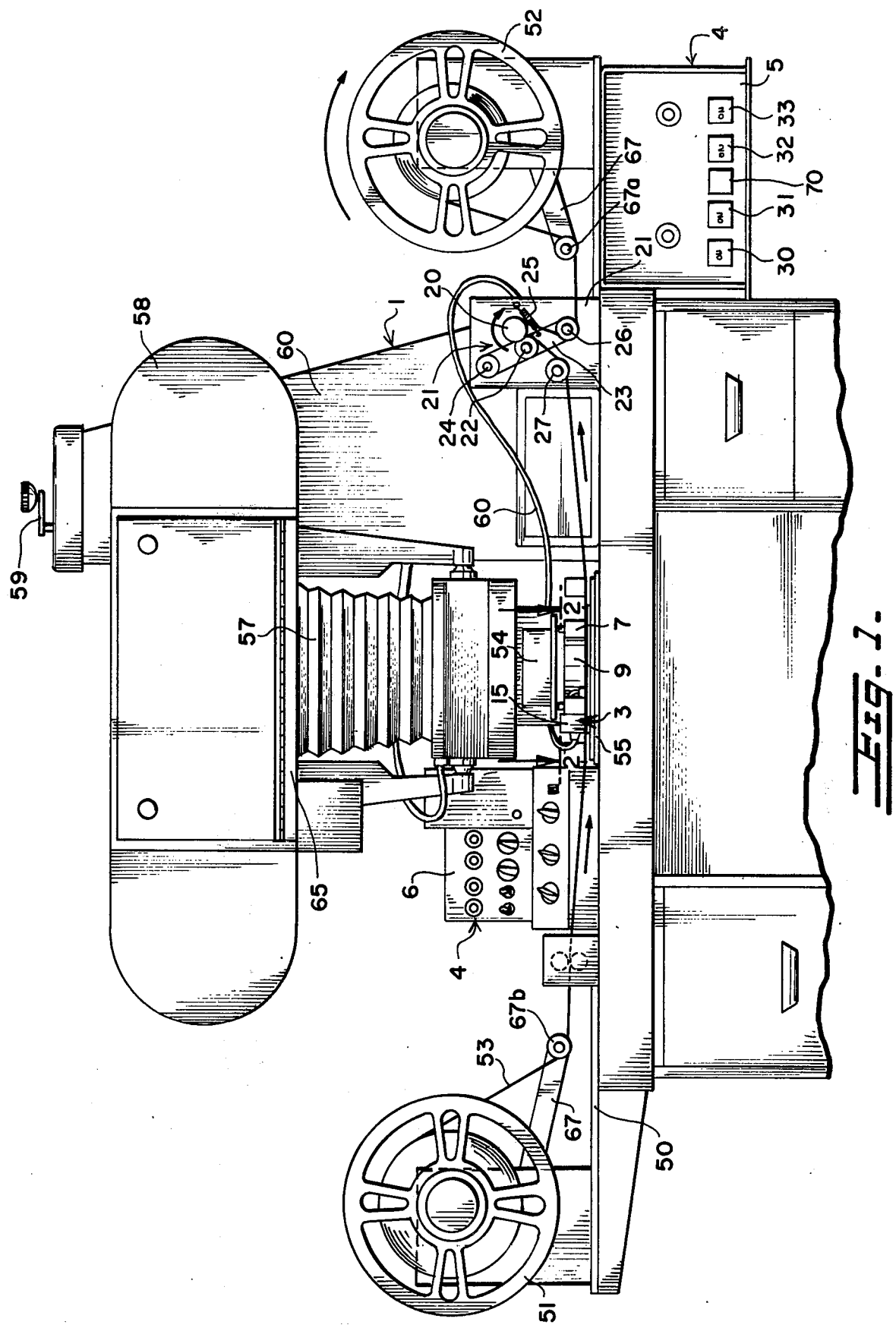
Figure 2:
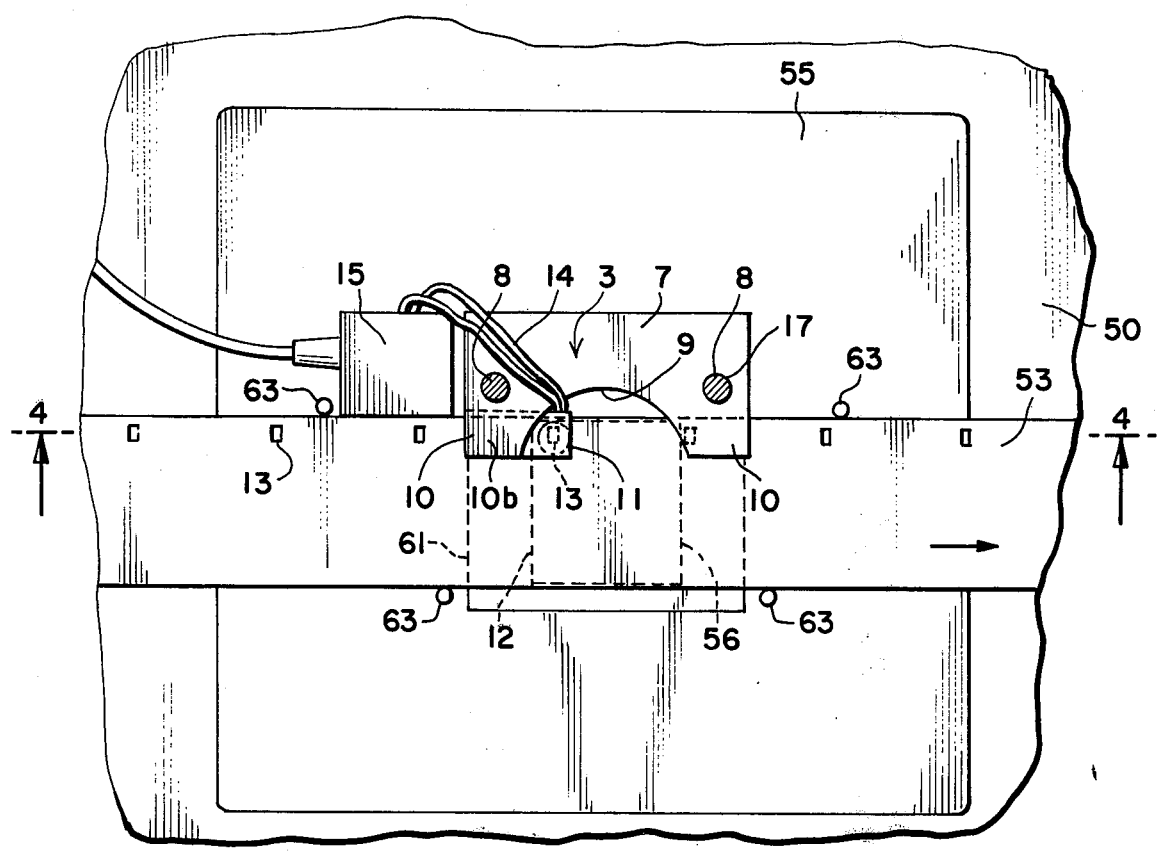
FIG. 2 is a section taken along the line 2—2 of FIG. 1.
Figure 3:
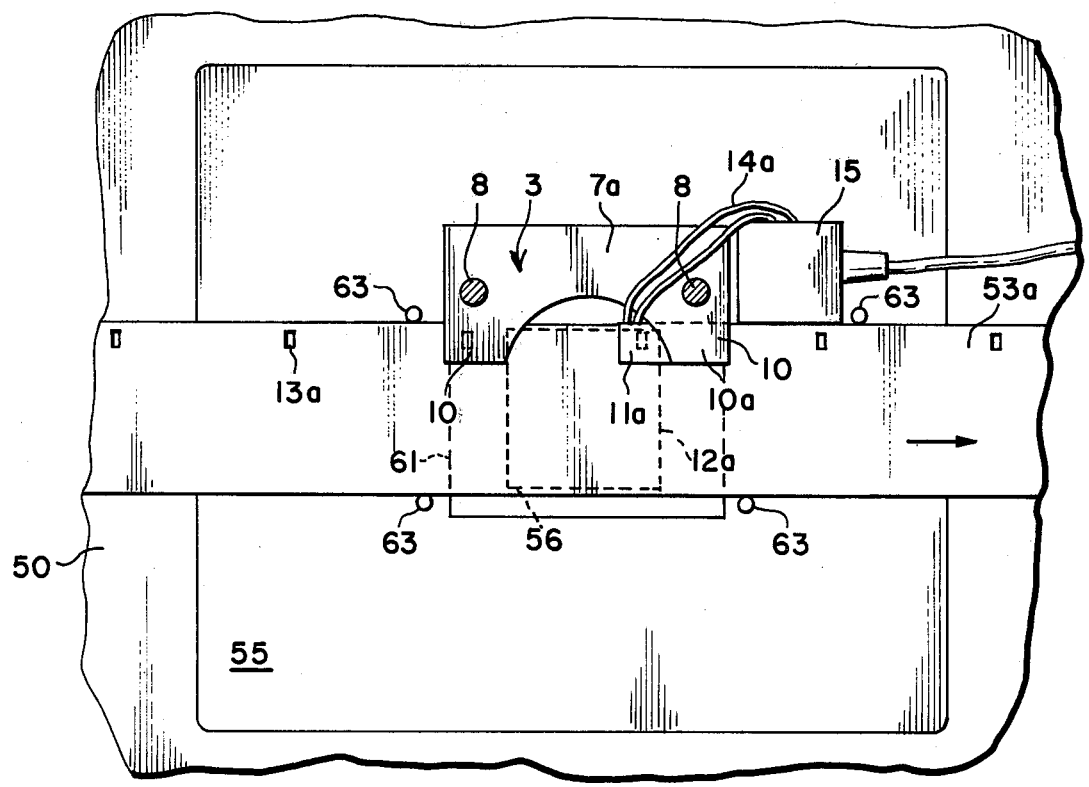
FIG. 3 is a section of FIG. 1 similar to that of FIG. 2 however showing a different yoke-photocell unit for a different size film.

Referring now to the drawings, and in particular to FIGS. 1-3, a film transporter, such as the Pakotronic printer and kodak 5S printer 1 is illustrated, which is provided with the device of the present invention, namely, a capstan drive and film tensioning unit 2, a photoelectric cell yoke unit 3 and a cooperative control device 4, the latter including a control box 5, operatively connected to the capstan drive and photoelectric cell, as will be described hereinafter in further detail. A control box 6, provided with the Pakotronic printer, controls exposure time and color change.

The conventional parts of the Pakotronic printer and Kodak 5S printer 1 comprise a table 50 on which there is mounted a supply reel 51 and a take-up reel 52 for holding a film 53, the latter which has already been spliced by a well-known device into a continuous film consisting of a plurality of negative frames having identification information between separate film frames. The take-up and supply reels 51 and 52, respectively, include conventional spring loaded tension arms 67 about which the film 53 passes from below on idler wheels 67b and 67a. The film 53 passes under a lens kit 54 including a lens mask for smaller size films. A bezel plate 55 is disposed on the table 50 underneath the lens and is provided with an opening 56 substantially the size of a frame of an individual negative or slightly smaller. The film track 53 passes above the bezel plate 55. A source of printing light (not shown) is provided underneath the table, the light rays thereof passing upwardly through the bezel opening 56 through the film 53 and the lens, in that order, into a bellows 57 and up into a print stock carriage 58 which houses a printing stock (not shown). The printing stock is stored in rolls and moved past a screen 65 behind the bellows 57. Each time an image is shot by the light source, the printing stock is moved by conventional means (not shown). An adjustment screw 59 is provided to raise and lower the print stock carriage on a stand 60, in order to change the magnification. After printing, the canisters with the printed stock are developed. Further, in accordance with the conventional unit, a light box or shadow box 63 is provided by which the film 53 may be pressed thereagainst, so that one can see the negative when desired.

In accordance with the present invention, for a particular size film, for example, film size 110, a photocell yoke unit of one size is used as shown in FIG. 2, and for another size film, for example, a larger film, such as film size 126, another photocell yoke unit 3 is used as illustrated in FIG. 3. The yoke photocell combination includes a yoke 7 which is removably disposed on posts 8 which are aligned parallel to a longitudinal edge of the film 53, the posts 8 being attached to the bezel plate 55. Posts 8 are provided with free ends at the upper portion thereof, and the yoke is provided with complementary holes 17 which fit posts 8. The yoke is formed with a substantially semi-circular shaped inner contour 9 and has two forward projecting arm portions 10 overlapping extending over film 53. For one size film, for example, film 53 of FIG. 2, the yoke has a photocell unit 11 secured to its left hand leg 10b and disposed adjacent the inner periphery 9 of yoke 7. The photocell 11, in this position, can detect the trailing edge 12 of a film frame and send a signal to control unit 5 to stop the movement of film 53 with the frame in precise location above bezel opening 56, so that the frame may be printed. The conventional form film 53 of size 110 is to provide the perforation holes 13 adjacent the trailing edge 12 of each frame, this being the reason for the disposition of the photocell on leg 10b.

Figure 4:
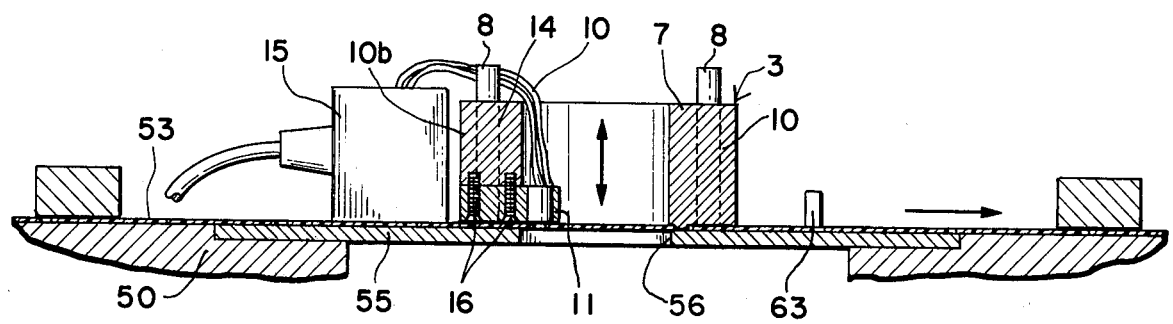
FIG. 4 is a section taken along the line 4—4 of FIG. 2.

The film travels across the surface of bezel plate 55 and is retained between guide pins 63 between which film 53 is guided. The yoke 7 overlapping film 53 includes a pressure plate 61 which helps the film therebelow to lie flat by means of its pressure against the film surface. The pressure plate has an opening which is approximately the same size as the film frame. The bezel plate also has an opening 62 to accommodate a fixed film size. Different bezel plates are used for different size film. The photocell 11 includes leads 14 which are removably inserted preferably by plug-in connectors (not shown) to the movable photoelectric connector 15. As shown in FIG. 4, the photoelectric unit is secured to the bottom of the yoke 8 on the arm 10b preferably by two countersunk screws 16 and lies adjacent the upper surface of film 53.

To use the device in accordance with the present invention with a different size film, as shown in FIG. 3, another photocell yoke 7a is placed on the pins 8. In this case, the yoke unit 3 has a photoelectric cell 11a integrally mounted on the right hand leg 10a. For film 53a, such as for example, film size 126, in accordance with the convention of this size film, the frame locating perforations 13a are provided adjacent the leading edge 12a of a frame, and accordingly, the photocell is correspondingly positioned on the leg 10a of the yoke 7a. The photocell leads 14a are inserted, however, into the same photoelectric connector 14 as in FIG. 2. Accordingly, the photoelectric connector 15 is moved in the embodiment of FIG. 2 to a position adjacent the right hand side of the unit near the leg 10a, and is operatively connected to the photoelectric cell 11a by the leads 14a. In all other respects, the yoke unit of FIG. 2 is similar to that shown and described in connection with FIG. 3.

Referring now further to FIG. 1, in accordance with the present invention, a motor driven capstan 20 is provided on a housing unit 21 and is driven by a motor (not shown) which motor is disposed in the housing unit 21. The film 53 passes around the capstan 20 and is engaged between the capstan and an idler roller 22 which frictionally presses the film against the capstan and insures that the film does not slip. The capstan motor is responsive to the control unit as will be hereinafter described, and moves the film in response to the photocell and in response to the perforations detected thereby. To insure the non-slippage of the film 53, the idler roller 22 is disposed substantially in the center of a one-arm lever 23 which is pivotably mounted at one end to the housing 21 on pivot 24, the lever 23 being biased counterclockwise toward the capstan drive wheel 20 by a spring 25. The spring 25 is attached to the housing 21, and to the lever 23 at a point between the centrally located idler roller 22 and an idler roller 26 mounted on the free end of the lever 23. The spring being disposed substantially perpendicularly to the length of the lever 23. An additional idler wheel 27 is provided on the unit 21 to the left of the lever 23, and the film 53 passes under the idler roller 27, between the idler roller 22 and the capstan 20, under the idler rollers 26 and 67a onto the take up reel 52, in that order. In accordance with the present invention a drive for the take up reel 52 (not shown) is continuously operating and which takes up any slack in the film between the capstan 20 and the takeup reel 52.

A motor or drag clutch (not shown) is also provided for the supply reel 51.

Figure 5:
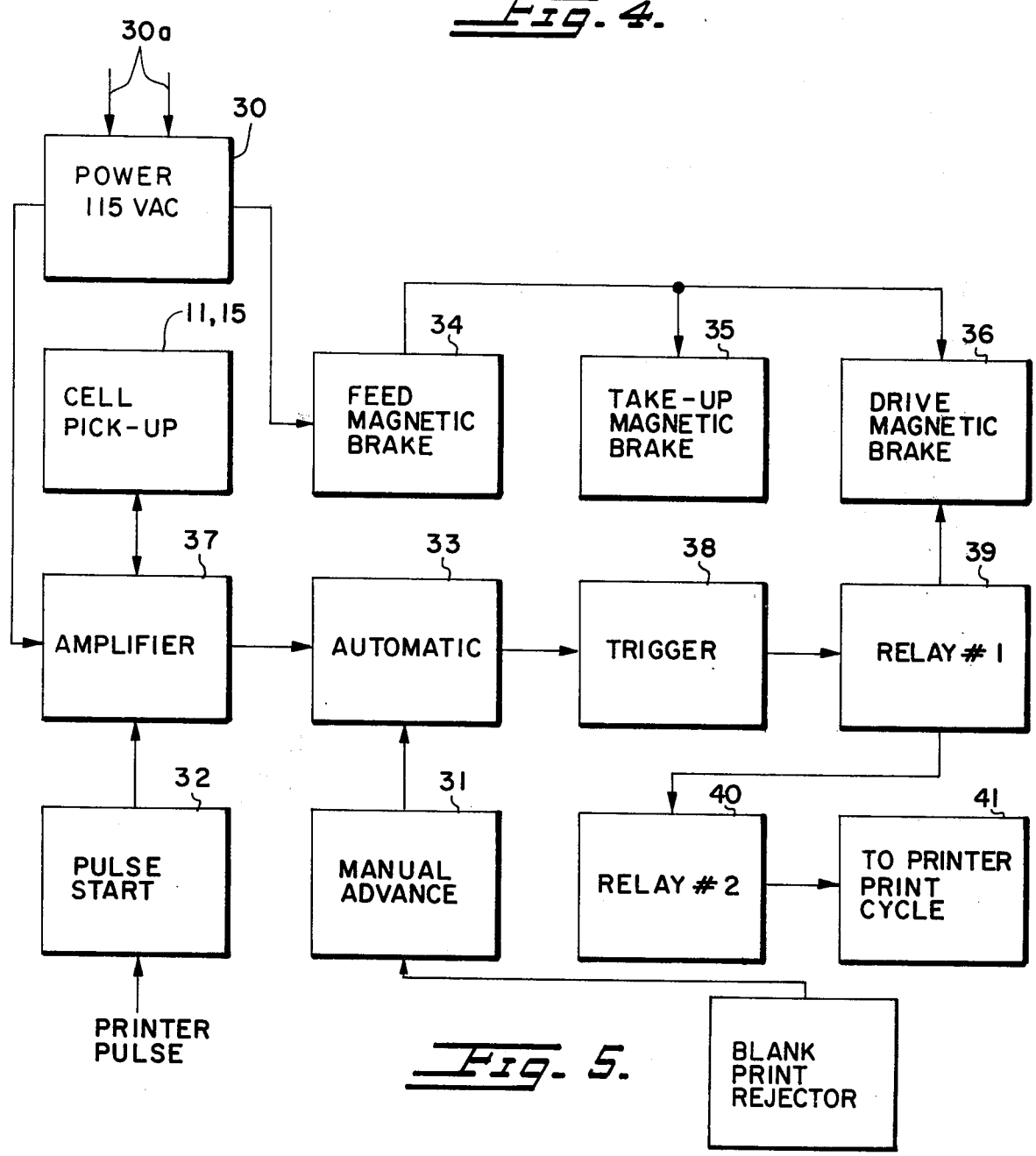
FIG. 5 is a schematic block circuit diagram of the control unit in accordance with the present invention.
Figure 6:
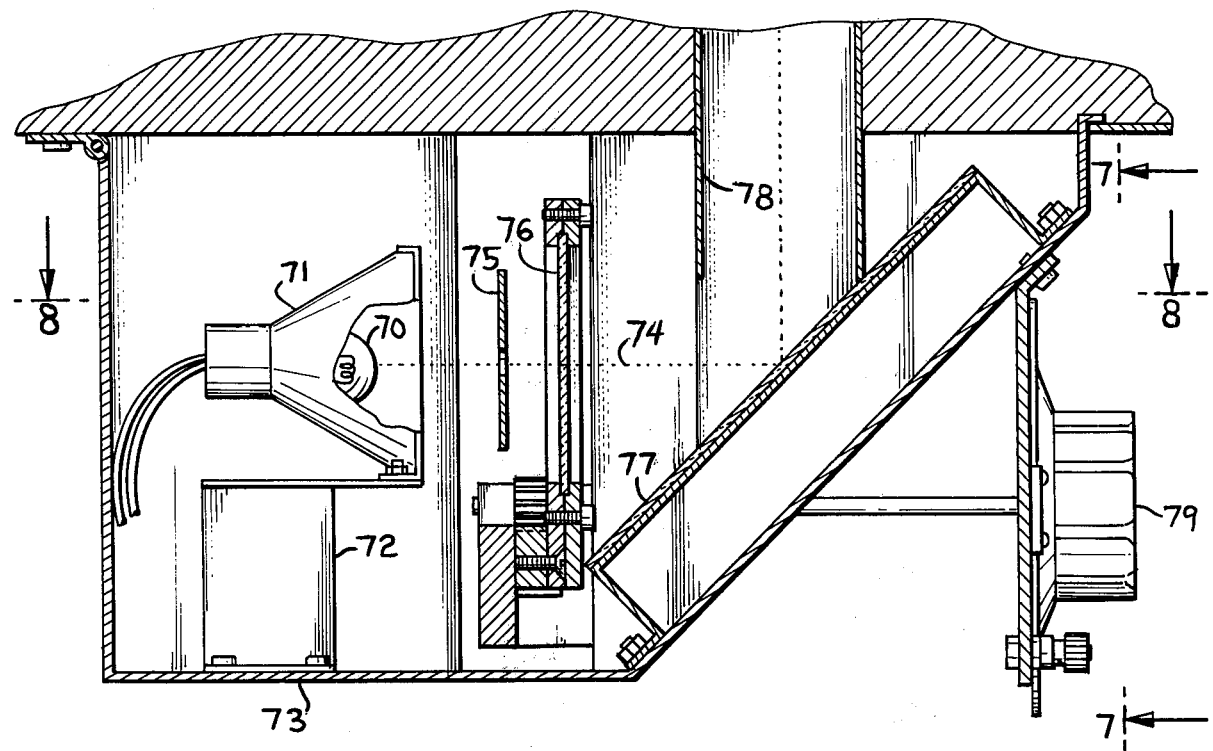
FIG. 6 is a cross sectional view showing the lamp projection apparatus of the present invention.

Referring now again to the drawings and more particularly to FIGS. 1 and 5, the control unit 4 for the unit comprises a control box which is mounted adjacent the table 50 at the right hand side under take-up reel 52 and includes a power start on-off switch 30 which is operatively connected to a 115 voltage AC source for turning on the power for the control unit. A manual advance button 31 is provided by which the film frame may be advanced one at a time by manually hitting this button. The control box 5 also includes an automatic button 33 which provides automatic feeding and printing of each frame sequentially one at a time by pressing this button. A pulse button 32 is further provided, by which multiple printing of the same negative frame is achieved by pressing this button for each additional print. Each button 30, 31, 32 and 33 is also illustrated in FIG. 4 which shows a schematic diagram of the associated circuitry thereof. The power circuit 30 is connected to the power source by lines 30a and after the power switch is activated an amplifier 37 is activated as well as the feed magnetic brake 34 connected to the power circuit, respectively. The feed magnetic brake 34, acts as a converter having circuitry therefor converting the 115 power supply AC voltage to suitable motor drive voltages. The feed magnetic brake 34 is connected to both the take-up magnetic brake drive 35 and the drive magnetic brake 36 for the capstan 20. These motors and drives continuously operate when the power is on. When the automatic circuit 33 is activated, as the film 53 is moved past the photoelectric cell 11, when the photocell detects the presence of a perforation 13, it sends a signal to amplifier 37 which passes through the automatic circuit 33 into a trigger circuit 38. The latter provides a trigger pulse to a relay #1 circuit 39, the latter in turn deenergizing the drive magnetic brake 36 for the capstan 20. Accordingly, the capstan stops driving the film 53 and a film frame is stopped directly opposite the opening 56 of the bezzle plate 55. Simultaneously, the relay circuit 39 activates a relay #2 circuit 40 which energizes a printer print cycle circuit 41 initiating a printer pulse causing the light underneath the table to flash and to print the negative on the stock in the print stock carriage 58. The print cycle circuit then causes the cycle to repeat by reactivating the capstan motor drive circuit 36 again.

The Pako printer also includes a control for the exposure time which is operatively connected into circuit 41 and provided on the box 4 mounted on the left side of the table adjacent the lens unit.

Below table 50 between its side drawers and underneath bezel 57 and its associated lens is located a light source as shown in detail in FIGS. 6-10. The light source consists of a lamp 70 mounted in a reflective type socket 71 which is mounted on bracket 72 and contained within housing 73. Housing 73 is bolted below the surface of table 50 so that the optical axis 74 of lamp 70 can be directed through a shutter 75, chromatic lens 76, so that the light will be reflected off a one-way mirror 77 and through a column 78 located in the surface of table 50.

Figure 7:
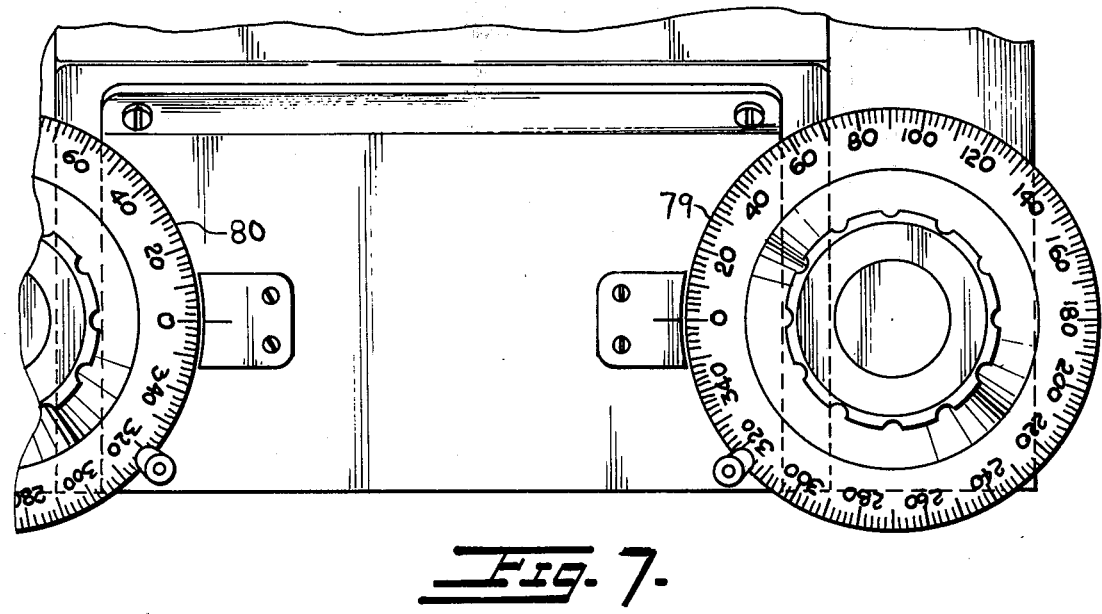
FIG. 7 is a view taken along section 7—7 of FIG. 6.
Figure 8:
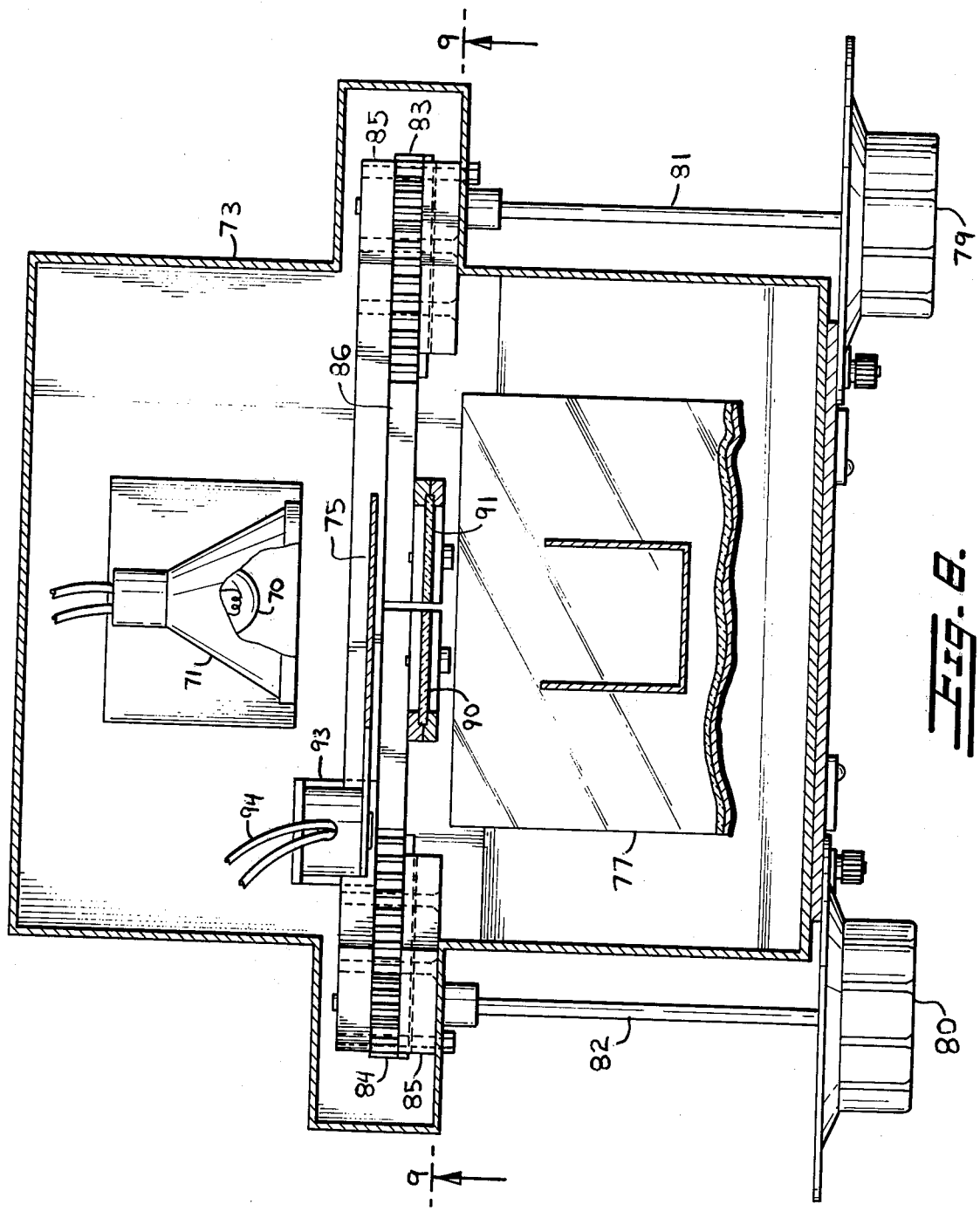
FIG. 8 is a view taken along section 8—8 of FIG. 6.
Figure 9:
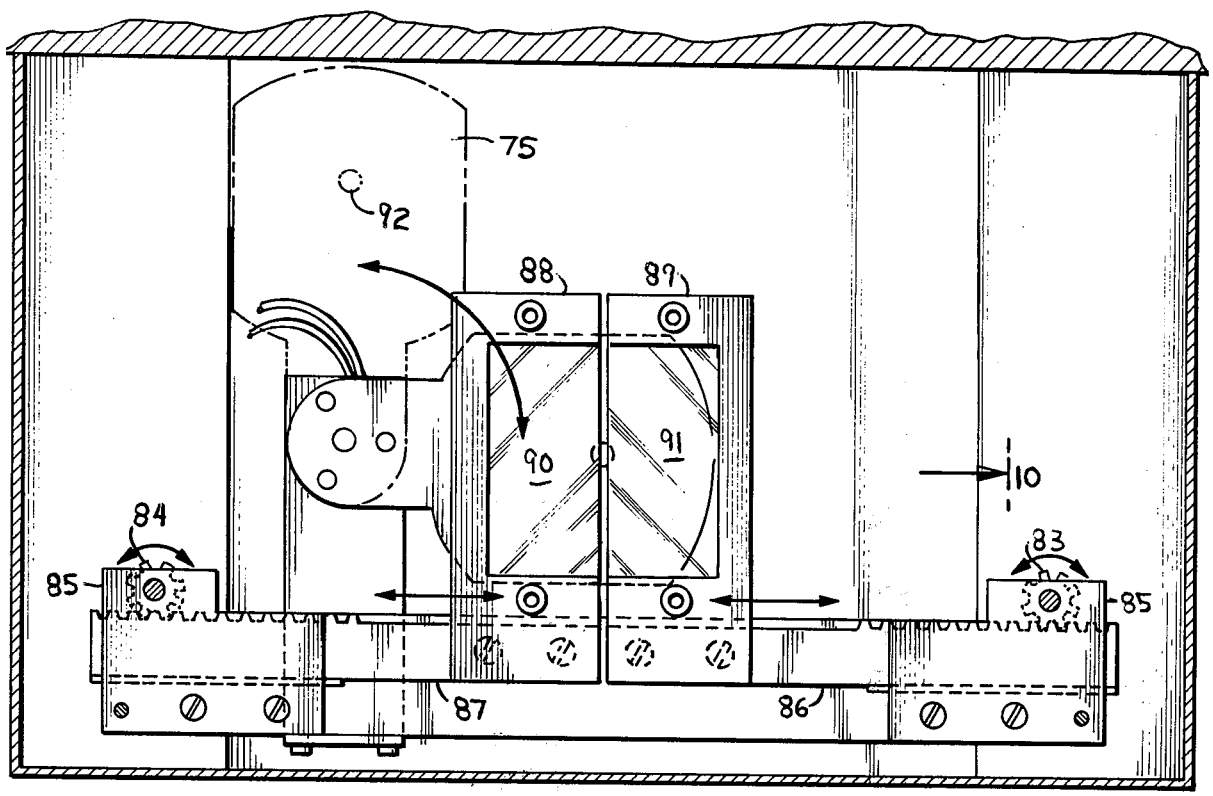
FIG. 9 is a cross sectional view taken along section 9—9 of FIG. 8.
Figure 10:
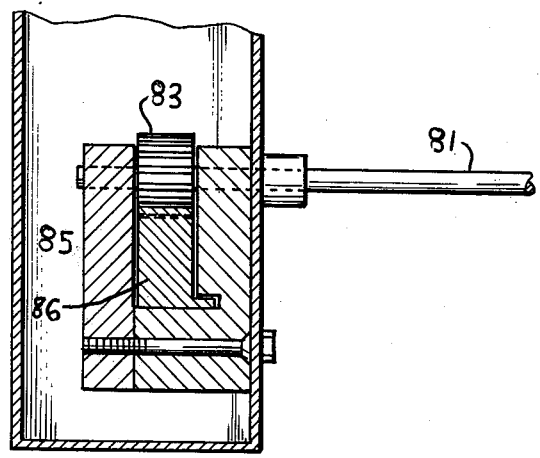
FIG. 10 is a cross sectional view taken along section 10—10 of FIG. 9.

The position of each chromatic lens is controlled by a calibrated knob 79 or 80 which has 360° of graduation as shown in FIG. 7. In the top view of FIG. 8, control knobs 79 and 80 are connected to the ends of shafts 81 and 82 respectively. The opposite ends of these shafts are coupled to spur gears 83 and 84 respectively which are mounted in journals 85 within the housing. Each of the gears 83 and 84 is meshed to a toothed rack 86 and 87 so that when the knobs are rotated, the gears can move the toothed racks independent of each other and closer or further apart from the optical axis 74 of lamp 70. Mounted on the ends of each of racks 86 and 87 are lens retaining bezels 88 and 89 respectively which are designed to hold chromatic lenses 90 and 91 within the frames of the bezels. As can be seen in FIG. 9, lenses 90 and 91 can be brought together toward the optical axis of the lamp beam or separated in response to the individual controls on knobs 79 and 80. This permits the color of the light transmitted to the negative to be changed or adjusted. Chromatic lenses 90 and 91 are preferably of complimentary colors so that the tint of the projected light can be easily adjusted.

Between lamp 70 and chromatic lenses 90 and 91 is disposed a pivotable shutter 75 having a small aperture 92. A solenoid motor 93 is connected to one end of shutter 75 so that the shutter can be electrically pivoted out of the optical axis of the light beam by power applied to conductors 94 connected to the solenoid. Thus, the operator of the film printer can control the intensity and color of the light by the operation of the chromatic lenses and the shutter apparatus.

While only a few embodiments of the present invention have been shown and described it will be obvious to those skilled in the art that many changes and modifications may be made thereunto without departing from the spirit and scope of the invention.

What is claimed is:

1. In a machine for transporting and printing a film track constituting a plurality of individual film negatives and corresponding perforated holes, and having the film track on a take-up reel and supply reel and extending therebetween to a printer, the latter including a light source lens and a screen for printing film on a printing stock, and a bezel plate having an opening substantially equal in size to that of a negative, the improvement comprising:
    a yoke having two projecting arms and therebetween a substantially semicircular inwardly directed peripheral recess and forming two openings disposed rearwardly adjacent the arms, two posts attached to and extending upwardly from said bezel plate;
    said yoke detachably mounted on said two posts, the latter being inserted in said two holes; and
    a photoelectric cell detector connected to one of the arms of said yoke in said peripheral recess.

2. The device as in accordance with claim 1 further comprising a movable photoelectric converter selectively positioned adjacent an arm of said yoke having said photoelectric cell secured thereto.

3. The device in accordance with claim 2 wherein said photoelectric cell is connected to a left arm of said two arms of said yoke.

4. The device in accordance with claim 2 wherein said photoelectric cell is connected to a film pressure plate coupled to said yoke.

5. In a device according to claim 4 further comprising control means operably connected to said photoelectric cell and to said capstan drive wheel for cyclically operatively automatically stopping said capstan drive wheel and said film track when said photoelectric cell detects the presence of a perforation hole in said film track and for printing a film negative, and for subsequently reactuating said capstan drive wheel.

6. The device in accordance with claim 2 further comprising a capstan drive unit disposed between said yoke and said take-up reel and having a substantially vertically oriented one-arm lever pivotably mounted adjacent a top thereof, and having a center idler wheel and a lower idler wheel on said lever;
    a capstan drive wheel mounted adjacent said center idler wheel; and
    a spring operatively connected adjacent to said center idler wheel and biasing said lever and said center idler wheel against said capstan drive, said film track being disposed under said idler wheels, and between said center idler wheel and said capstan, whereby the film track is driven non-slipably by said capstan drive wheel.

7. The device as recited in claim 1 additionally comprising:
    a projection lamp;
    chromatic lens means disposed in the optical axis of said projection lamp; and
    means for transmitting the beam of said projection lamp onto the opening of said bezel plate containing the negative to be printed.

8. The device as recited in claim 7 wherein said chromatic lens means comprises a first chromatic lens supported on a first toothed rack, a second chromatic lens supported on a second toothed rack in linear alignment with said first toothed rack, manual control means including spur gears coupled to each of said toothed racks for changing the position of each of chromatic lenses with respect to the optical axis of said projection lamp.

9. The device as recited in claim 8 wherein said means for transmitting light comprises a one-way mirror mounted adjacent to each of said chromatic lenses in the optical axis of said projection lamp and a column communicative to the negative bezel opening.

10. The device as recited in claim 9 additionally comprising a shutter disposed between said chromatic lenses and said projection lamp and a solenoid connected to one end of said shutter for pivoting said shutter in and out of the optical axis of said projection lamp beam.

* * * * *